(12) United States Patent
Berberich et al.

(10) Patent No.: US 7,306,276 B2
(45) Date of Patent: Dec. 11, 2007

(54) COVER MODULE

(75) Inventors: Wolfgang Berberich, Freudenberg (DE); Hans-Joachim Fuchs, Dorfprozelten (DE); Wolfram Meyer, Stadtprozelten (DE); Edwin Seitz, Neuenbuch (DE)

(73) Assignee: Magna Donnelly GmbH & Co. KG, Dorfprozelten (DE)

( * ) Notice: Subject to any disclaimer, the term of this patent is extended or adjusted under 35 U.S.C. 154(b) by 0 days.

(21) Appl. No.: 10/510,813

(22) PCT Filed: Aug. 23, 2002

(86) PCT No.: PCT/DE02/03137

§ 371 (c)(1),
(2), (4) Date: Oct. 7, 2004

(87) PCT Pub. No.: WO03/093061

PCT Pub. Date: Nov. 13, 2003

(65) Prior Publication Data
US 2005/0151396 A1    Jul. 14, 2005

(30) Foreign Application Priority Data
Apr. 29, 2002 (DE) ............... 102 19 220
Apr. 29, 2002 (DE) ............... 102 19 222
Apr. 29, 2002 (DE) ............... 202 06 741

(51) Int. Cl.
B62D 25/06 (2006.01)

(52) U.S. Cl. ............... 296/24.34; 296/193.04; 296/37.7; 296/215

(58) Field of Classification Search ............ 296/24.34, 296/193.04, 37.7, 97.5, 97.9, 214, 215, 97.6, 296/97.8
See application file for complete search history.

(56) References Cited

U.S. PATENT DOCUMENTS

| | | | |
|---|---|---|---|
| 1,546,571 A | | 7/1925 | Dewald |
| 4,100,372 A | | 7/1978 | Hypolite |
| D282,733 S | * | 2/1986 | Giavazzi et al. ........... D12/195 |
| 4,818,010 A | | 4/1989 | Dillon |
| 4,908,611 A | | 3/1990 | Iino |
| 5,124,833 A | | 6/1992 | Barton et al. |
| 5,154,617 A | * | 10/1992 | Suman et al. ............... 296/37.7 |
| 5,192,110 A | | 3/1993 | Mykytiuk et al. |
| 5,469,298 A | | 11/1995 | Suman et al. |
| 5,822,023 A | | 10/1998 | Suman et al. |
| 5,825,096 A | | 10/1998 | Morimoto et al. |
| 5,956,181 A | | 9/1999 | Lin |
| 6,065,793 A | * | 5/2000 | Koshida et al. ............ 296/37.1 |

(Continued)

FOREIGN PATENT DOCUMENTS

DE    43 09 492 C1    9/1994

(Continued)

Primary Examiner—Jason S Morrow
(74) Attorney, Agent, or Firm—McGlew and Tuttle, P.C.

(57) ABSTRACT

A covering module (04, 05, 09, 19, 29, 48, 60) is provided for arrangement on the inside of the roof of a vehicle. The covering module (04, 05, 09, 19, 29, 48, 60) covers the inside of the roof in the area of the sheet metal car body (02) at least partially, in particular essentially completely. All function elements to be provided overhead from the passengers in the vehicle are completely preassembled on the covering module (04, 05, 09, 19, 29, 48, 60).

69 Claims, 7 Drawing Sheets

U.S. PATENT DOCUMENTS

| | | | |
|---|---|---|---|
| 6,135,528 A | 10/2000 | Sobieski et al. | |
| 6,157,418 A | 12/2000 | Rosen | |
| 6,267,428 B1 * | 7/2001 | Baldas et al. | 296/37.7 |
| 6,324,450 B1 | 11/2001 | Iwama | |
| 6,565,140 B2 * | 5/2003 | Wells | 296/97.8 |
| 6,593,904 B1 | 7/2003 | Marz et al. | |
| 2001/0005804 A1 | 6/2001 | Rayner | |
| 2002/0005777 A1 | 1/2002 | Rodewald et al. | |
| 2002/0021029 A1 | 2/2002 | Bohm et al. | |
| 2002/0038959 A1 * | 4/2002 | Francis et al. | 296/97.6 |
| 2003/0098595 A1 * | 5/2003 | Carter et al. | 296/215 |
| 2005/0093321 A1 * | 5/2005 | MacWilliam et al. | 296/24.34 |
| 2005/0116510 A1 * | 6/2005 | Leroy et al. | 296/216.01 |
| 2005/0212319 A1 * | 9/2005 | Gil et al. | 296/37.7 |
| 2006/0035502 A1 * | 2/2006 | Tiesler et al. | 439/340 |
| 2006/0061145 A1 * | 3/2006 | Strebe et al. | 296/214 |

FOREIGN PATENT DOCUMENTS

| | | |
|---|---|---|
| DE | 43 29 983 A1 | 3/1995 |
| DE | 42 38 275 C2 | 4/1995 |
| DE | 296 06 475 U1 | 8/1996 |
| DE | 198 08 982 A1 | 9/1999 |
| DE | 198 50 371 A1 | 5/2000 |
| DE | 200 09 531 U1 | 10/2000 |
| DE | 196 53 431 C2 | 1/2001 |
| DE | 199 41 560 A1 | 3/2001 |
| DE | 199 58 605 A1 | 6/2001 |
| DE | 100 07 657 A1 | 9/2001 |
| DE | 100 23 585 A1 | 12/2001 |
| EP | 0 278 069 A1 | 8/1988 |
| EP | 0 304 198 A2 | 2/1989 |
| EP | 0 381 016 A1 | 8/1990 |
| EP | 0 689 964 A1 | 1/1996 |
| EP | 1 067 019 A1 | 1/2001 |
| EP | 1 087 464 A3 | 3/2001 |
| FR | 2 728 198 | 6/1996 |
| JP | 58185338 | 10/1983 |
| JP | 58209635 | 12/1983 |
| JP | 59084641 | 5/1984 |
| JP | 61182023 | 8/1986 |
| JP | 63295982 | 12/1988 |
| JP | 05286393 | 11/1993 |
| JP | 10324196 A | 12/1998 |
| JP | 2000006854 | 1/2000 |
| JP | 2000225892 | 8/2000 |
| JP | 2002029255 * | 1/2002 |
| WO | WO 01/49526 A1 | 7/2001 |
| WO | WO 01/64481 A2 | 9/2001 |

* cited by examiner

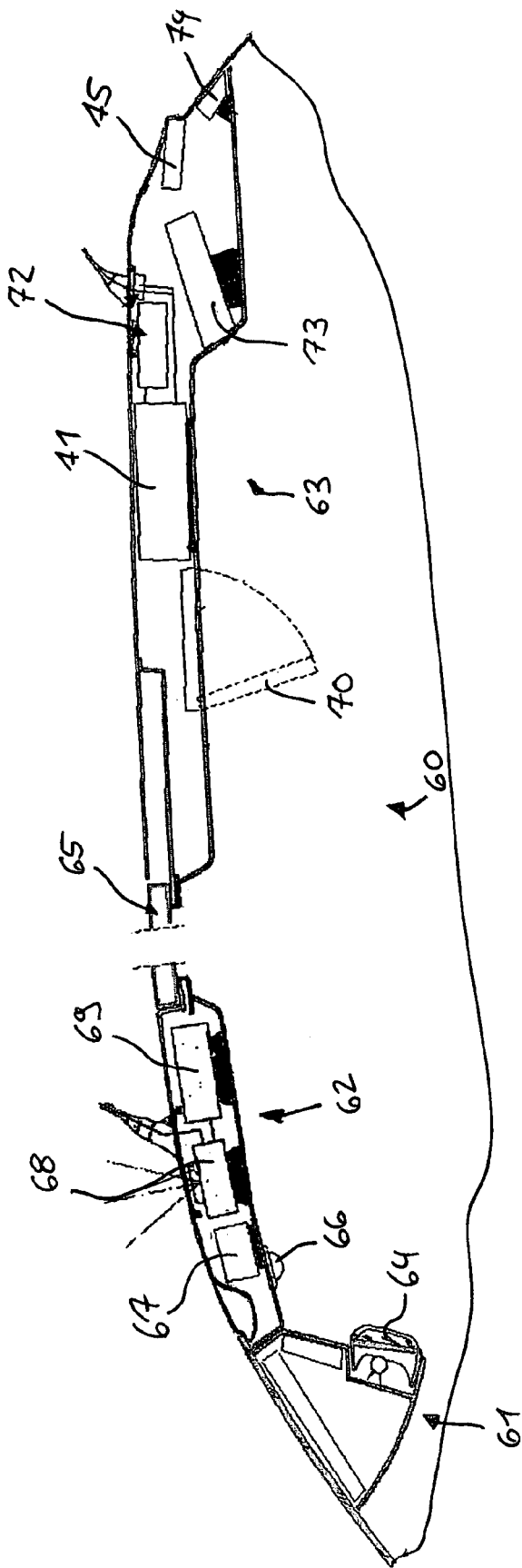

COVER MODULE

FIELD OF THE INVENTION

This invention relates to a covering module for arrangement on the inside of the roof of a motor vehicle.

BACKGROUND OF THE INVENTION

Generic covering modules are used in automotive engineering to cover the sheet metal car body on the inside of the roof of the vehicle toward the interior. In a nontechnical context, such a covering module is often referred to as a "headliner."

A plurality of function elements that may be used by the driver or the other passengers of the vehicle are provided in modern vehicles. To be able to accommodate the plurality of function elements in the motor vehicle, the trend has been to arrange many of these function elements in the overhead area. In assembly of the vehicle, these function elements must therefore be mounted individually on the covering module.

The assembly of function elements on the cover modules is tedious and time-consuming because of the arrangement of generic covering modules on the inside of the roof. i.e., in the overhead area for the assembly personnel.

SUMMARY OF THE INVENTION

Therefore, against the background of this state of the art, the object of the present invention is to provide a covering module which simplifies the final assembly of vehicles.

According to this invention, all function elements provided in the area above the head of passengers in a motor vehicle are completely preinstalled. Pre-installation of the function elements may be performed in a position that is advantageous from the standpoint of assembly, because the covering module can be handled freely before the final assembly. For final assembly, the covering module with the pre-installed function elements is then mounted in the area of the interior of the roof of the vehicle, thus eliminating the mounting of additional function elements on the covering module. As a result, a great deal of assembly time can be saved in final assembly of vehicles, and furthermore, the burden for the assembly personnel can be reduced.

According to a preferred embodiment of this invention, at least one contact element, e.g., a plug strip, is provided on the covering module. This contact element is used to provide electric or electronic contacting of several function elements provided on the covering module. For example, if all function elements of the covering module can be contacted via the contact element, it is sufficient in final assembly of the vehicle to contact this one contact element to the onboard network in order to make the entire covering module functional. In addition to the conventional 12-volt power supply, a 42-volt power supply would also be conceivable. In addition, a data connection to the databus (LAN, CAN, LIN) of the vehicle may also be created via the contact element.

It is especially advantageous if the covering module can be locked or clipped in place with a simple joining movement on the inside of the roof. Due to this type of attachment, the assembly time in final assembly of the vehicle can be further shortened.

The contact elements provided on the covering module should be designed and arranged so that they can be contacted with the contact elements designed with a complementary function by fastening the covering module to the inside of the roof without requiring any additional assembly effort. As a result, this eliminates one assembly operation, namely separate assembly of the contact elements. Instead, contacting of the contact elements is accomplished merely by the fact that the covering module is moved to the correct position on the inside of the roof and secured there.

The covering module itself may have essentially any design, which may be adapted to the particular features of the respective vehicle. However, covering modules according to this invention offer special advantages when they need not cover the entire surface on the inside of the roof. According to a preferred embodiment of this invention, the covering module therefore has large-area recesses and/or concavities in which transparent components, in particular panes of glass, may be arranged and form a portion of the roof of the vehicle. The transparent components are of course mounted and attached to the automobile body to guarantee a sufficient stability of the automobile roof. As a result, this design achieves the effect that the covering modules are relatively compact components whose inherent weight is not too great and which can be handled well because of their relatively small size. Because of the preassembly of the required function elements according to this invention, such covering modules can then be attached to the vehicle in a simple "plug and play" joining action.

Essentially any desired number of covering modules may be used to cover the inside of an automobile roof. In particular, it is conceivable for the covering module to be designed in multiple parts, in which case then one part of the covering module can be installed so it faces toward the front of the vehicle and the other part of the covering module can be installed so it faces toward the trunk of the vehicle. This design offers the advantage in particular that the respective covering modules can be handled from the front or from the rear through the windshield or through the rear window.

Essentially any type and design of the function elements pre-installed on the covering module are possible according to this invention. Thus, a large number of function elements, which may be pre-installed on the covering modules according to this invention, are conceivable.

According to an especially preferred embodiment, the interior rearview mirror of the vehicle is integrated into the covering module. To do so, a recess is provided in the area in front of the windshield, with a rearview device arranged in this recess so that the driver can observe the following traffic. The recess is arranged and designed in such a way that the driver can observe with a sufficient field of vision the traffic following behind the vehicle after the rearview device has been arranged in the recess. By integration of the rearview device into the covering module, the separate installation of a rearview mirror may be omitted. One particular advantage of this embodiment is that the area between the two side sun visors at the upper edge of the front windshield is covered by the covering module so that separate devices to provide shade such as a central sun visor may be omitted.

In the simplest embodiment, the rearview device is designed in the manner of a mirror element, which is also used in a corresponding design with conventional interior rearview mirrors.

This arrangement of a mirror element on a covering module according to this invention offers special advantages when a remote-controlled adjustment of the mirror element is desired, because a suitable drive for adjusting the angle of view of the mirror element can be installed in the hollow space formed by the covering module in a simple manner.

Suitable adjustment devices also include in particular adjustment drives such as those used to adjust the mirror element in exterior rearview mirrors.

If an adjustment drive is provided on the mirror element, it is therefore possible to provide a memory function for the adjustment of the mirror element. In other words, depending on the choice made by the driver, in addition to other settings. e.g., the seat setting and the adjustment of the exterior rearview mirror, it is also possible for the mirror element in the interior to be adjusted automatically according to a position stored for the respective driver.

The mirror element may also be designed in the manner of a glass prism having two reflective surfaces, in which case it is then possible in particular to dim the mirror element by remote-controlled drive of the glass prism.

As an alternative to dimming by adjusting a glass prism, an electrochromatic dimming system may also be provided on the mirror element, such that its transmission properties can be altered through corresponding electric or electronic triggering.

As an alternative to use of a conventional mirror element as a rearview device, an electronic display may also be built into the recess in the covering module. This display is then to be connected to a suitable camera arranged on the vehicle so that the image data picked up by the camera can be displayed on the display in the interior of the vehicle.

As an alternative to the use of mirror elements or displays as rearview devices, projection devices may also be used, projecting the image data of a camera system onto a projection surface where they can be reflected and observed by the driver. Studies in using electronic displays as rearview devices have shown that the driver's eye must refocus to observe the display, which requires a certain reaction time. This effect can be avoided by using projection devices having projection surfaces.

According to a preferred embodiment, not only the projection surface is integrated into the covering module, but also the projection device is integrated into it. When both the projection device and the projection surface are integrated into the covering module, this makes it possible to achieve the result that the adjustment of the projection device on the projection surface can be performed during the preliminary assembly. In the final assembly of the vehicle, the adjusted projection system is then installed together with the covering module and further adjustment is eliminated.

With known vehicles the sun visors which are required for protection from sun are installed as separate parts on the inside of the roof in the area of the upper edge of the windshield. This type of installation of sun visors represents an additional effort in automotive assembly. For further integration of function, it is therefore proposed that a left and/or tight sun visor be mounted adjustably on the covering module according to this invention. As a result, this also makes it possible to pre-install and pre-adjust sun visors on the covering module and eliminate the step of installing the sun visors in the final assembly of the vehicle. Essentially any desired manner of adjusting the sun visors between their resting position and the sun protection position is possible. For example, it is conceivable for the sun visors to be pivoted in a rotational movement between the resting position and the sun protection position in the known manner. To do so, for example, the sun visors may be designed in the manner of plate-shaped components which are mounted laterally on the covering module by means of corresponding axles.

As an alternative to this design it is also possible to implement new designs for sun visors. In particular when using covering modules according to this invention, it is conceivable for the sun visors to be pulled out linearly and retracted linearly between the resting position and the sun protection position, because the hollow space formed by the covering module can accommodate the sun visors in the resting position. To implement such designs, it is possible, for example, for the sun visors to be designed in the manner of rolling blinds that can be pulled out. It is thus also possible in particular to pull out the sun visors only partially as needed.

Due to the hollow space formed by the covering module, it is also possible to provide a drive device, e.g., suitable electric motors, accordingly for adjustment of the sun visors. Then to adjust the sun visors, the driver need not make any manual adjustment and instead a remote-controlled adjustment of the sun visors can be implemented. In particular it is also conceivable to automatically adjust the sun visors as a function of certain external conditions, e.g., a certain incidence of light.

In addition, adjustably mounted additional visors may also be provided on the sun visors. By pivoting out or pulling out these additional visors, the shading effect of the sun visors may be further increased if necessary. This is advantageous in particular when the driver is to be protected from the incident light of the sun low in the sky.

In addition to integration of rearview device and/or sun visors, it is also possible to provide an optical and/or acoustic sensor on the covering module according to this invention with which video data and/or audio data can be recorded in the passenger compartment. Due to the reception of this video and/or audio data, it is possible to record and document events in the passenger compartment, so that in the event of accidents, for example, it is possible to reconstruct the causes of the accident accordingly.

In principle, the optical sensor may be designed in any desired manner. Video cameras, in particular digital video cameras with a CCD chip, are especially suitable because first, these devices are available inexpensively and secondly they allow a good recording quality of the video data.

To be able to accommodate the largest possible areas in the passenger compartment with an optical sensor, it is especially advantageous if a wide-angle lens, preferably a lens having a "fish-eye" characteristic, is provided on the optical sensor.

It is in principle irrelevant where in the passenger compartment the optical and/or acoustic sensor is arranged in terms of implementation of a data recording system according to this invention. Frequently, however, accidents are caused by a certain improper behavior on the part of the driver. This improper behavior may be due, for example, to the fact that a fatigued driver closes his eyes in a so-called "sudden sleep." Furthermore, many drivers turn their attention to their passengers or the car radio for too long a period of time so that sufficient attention in observation of traffic is no longer possible during this period of time. In addition, in the case of drivers with special health restrictions such as people with diabetes or people with a heart pacemaker, there may be a temporary loss of capabilities. To be able to detect such causes for accidents, it would be especially advantageous if the field of vision of the driver were recorded with the optical sensor. Such image data could then also be used in particular to exonerate the driver of responsibility and/or liability.

It is also advantageous if the optical sensor can be used to observe people such as children on the back seat. This also makes it possible to document the behavior of the passengers on the back seat so that it is possible to ascertain retroactively whether this behavior has been the cause of an accident. Furthermore, it is possible by observing the back seat to display the current image data on a display device, e.g., on a display screen for the driver. In this way the driver can observe what is going on in the rear part of the vehicle without turning his head.

It is also advantageous if the optical sensor is suitable for triggering a child seat recognition. Through the use of such systems it is then possible to recognize whether a child seat has been installed in a seat and if so, in which location. With this information the airbag system in the vehicle can then be controlled so that the corresponding airbags are not deployed in the event of an accident if a child seat is installed in that location.

It is in principle conceivable to store the data thus compiled permanently in the buffer. Then, however, this would result in an enormous volume of data over a period of time, so that at least partial deletion of data is necessary to reduce the data volume. It is therefore especially advantageous if the data is stored in a memory unit temporarily and deleted on a rolling basis. For example, it is possible to always store the data of the last 5 to 60 seconds in the memory unit. All data behind this time horizon is deleted because it may be assumed that corresponding events in the passenger compartment could not have been the cause of an accident. Through rolling data storage, this yields the result that only a relatively small volume of data need be stored temporarily at any time. Such a volume of data today can be stored electronically in a buffer memory in corresponding suitable electronic memory modules.

As an alternative to rolling data storage, it is also possible to record the data in blocks every 60 seconds on an external data medium, such as a writable CD-ROM.

In addition to integration of rearview devices, sun visors and/or data acquisition sensors, it is also conceivable to pre-install an antenna carrier element on the covering module according to this invention. With such embodiments, a recess is then provided on the roof of the vehicle so that the antenna carrier element can be accommodated in the recess.

Preferably the surface of the antenna carrier element is essentially flush with the surface of the roof of the vehicle. In addition, an antenna may be arranged directly or indirectly on the underside of the antenna carrier element opposite the surface. This antenna is primarily a GPS antenna; in this case, it may be integrally connected to a telematics control unit (control unit for operation of the GPS system) and thus pre-installed completely on the covering module. As an alternative, the antenna may also be a radio antenna or a wireless antenna. In all cases, the antenna may be integrally connected to the antenna carrier element. In the latter case, a preferred embodiment is characterized in that the material of the antenna carrier element is extruded around the antenna.

Primarily through such an antenna carrier system a GPS antenna can be optimally accommodated in the vehicle.

The antenna itself may have essentially any desired shape. According to a preferred embodiment, the antenna is designed in the manner of a ring body antenna, which also guarantees very good radio reception in the case of a suitable compact design.

If the antenna itself does not project beyond the antenna carrier element but instead is situated beneath the antenna carrier element, then the antenna carrier element must be made of a material such as plastic or glass which is permeable for electromagnetic waves.

In addition to integration of a rearview device, sun visors, data recording sensors and/or antenna modules, it is also conceivable to pre-install a number of other function elements, e.g., lighting equipment (interior lighting, reading lights, console lighting), radio receivers, loudspeakers, anti-theft alarm systems, multifunction displays, sliding roof controls, video displays or distance sensors on the covering module according to this invention.

Various embodiments of this invention are illustrated in the drawings and explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 7 is a cross sectional view showing a sixth embodiment of a covering module according to this invention.

DESCRIPTION OF THE PREFERRED EMBODIMENTS

Figure 1:
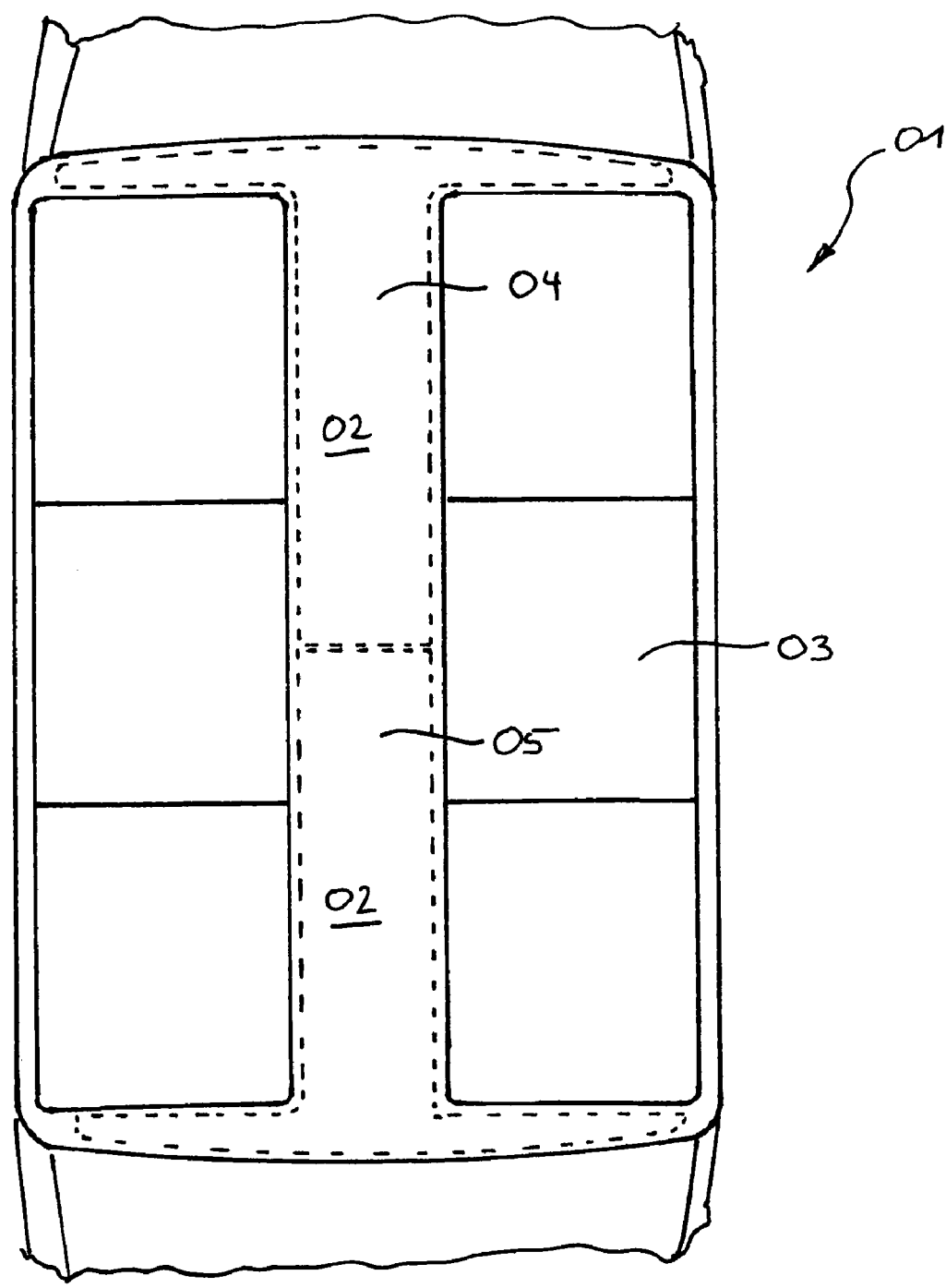
FIG. 1 is a schematic diagram of a vehicle having an automotive roof in a view as seen from above.

FIG. 1 shows an automobile roof 01 of a vehicle diagramed schematically, shown in a view from above. The vehicle roof 01 is formed by the sheet metal car body 02 together with six panes of glass 03. For this purpose, recesses are provided in the sheet metal car body on the sides of the vehicle, with panes of glass 03 inserted into these recesses. Two covering modules 04 and 05, indicated with dash-dot lines in FIG. 1, are attached to the inside of the roof of vehicle roof 01 to cover the sheet metal car body 03.

Figure 2:
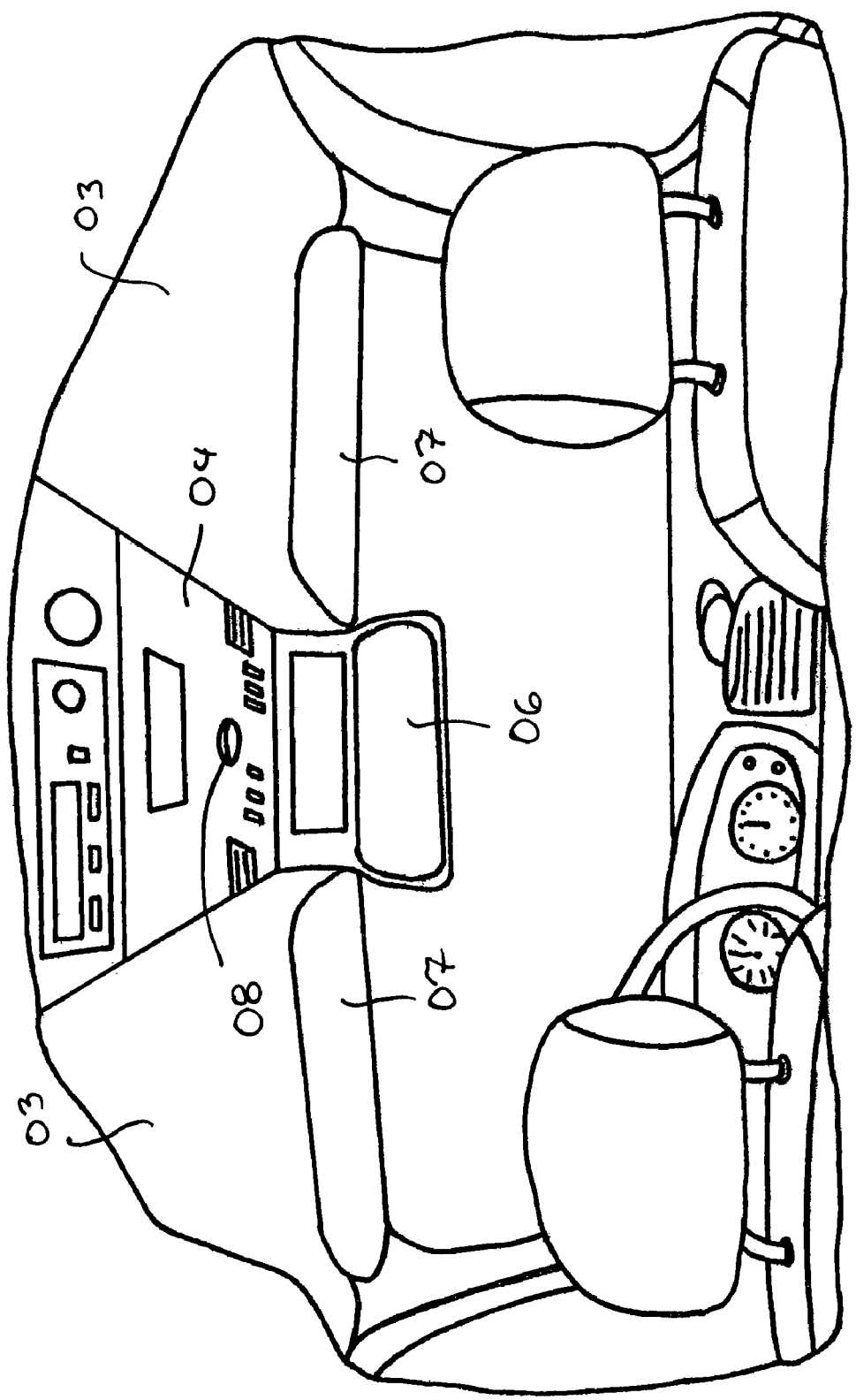
FIG. 2 is a perspective interior view showing the vehicle according to FIG. 1 having a covering module according to this invention.

Front covering module 04 is shown in a perspective interior view in FIG. 2. A wide variety of function elements, in particular a rearview device 06, two sun visors 07 and an optical sensor 08, are provided on covering module 04. All these function elements were pre-installed on covering module 04, and together with covering module 04 they are attached to the inside of the vehicle during the final assembly of the vehicle.

Figure 3:
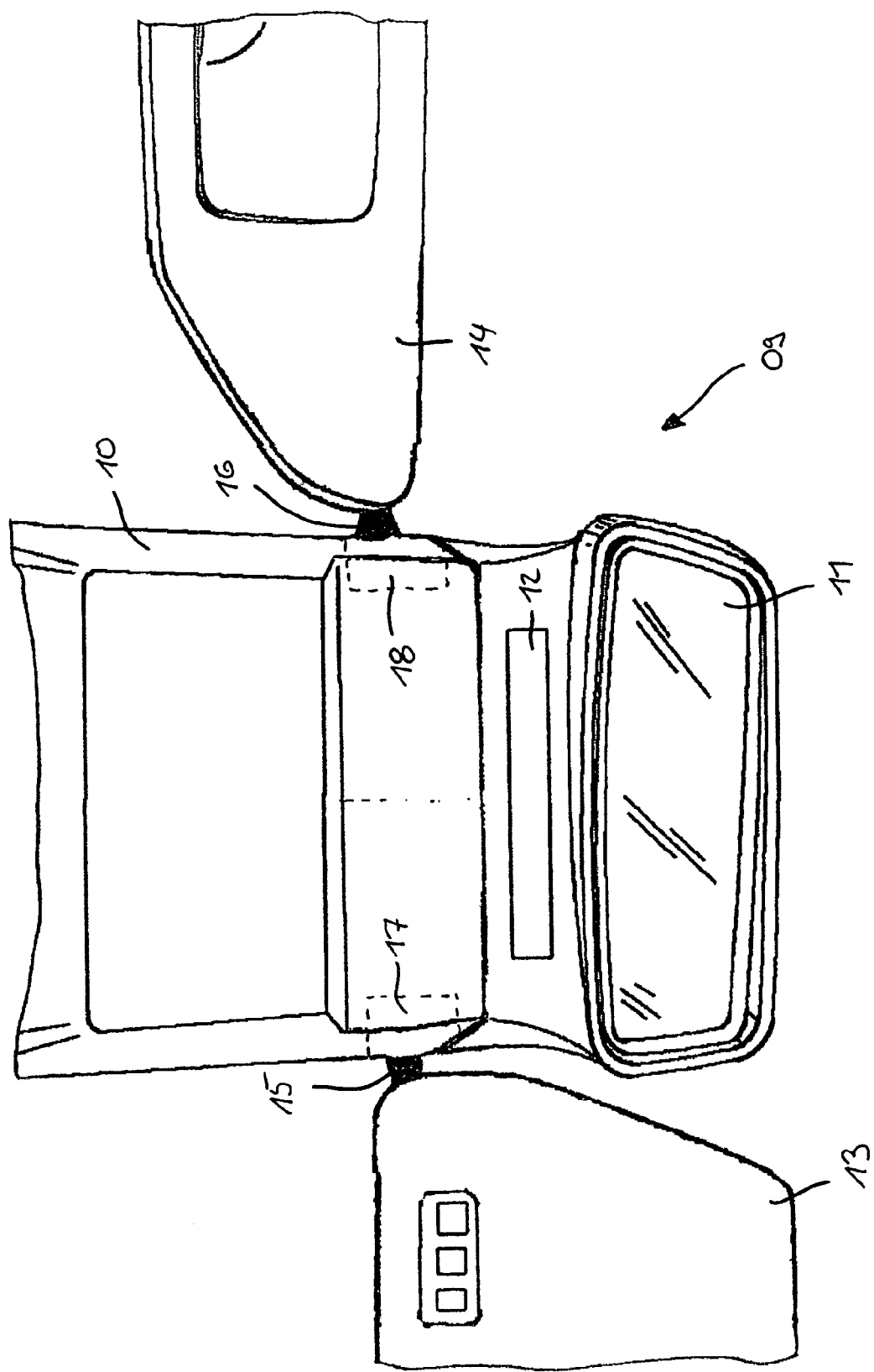
FIG. 3 is front view of a second embodiment of a covering module according to this invention.

FIG. 3 shows a second embodiment 09 of a covering module according to this invention, shown schematically. Covering module 09 has a main body 10 on which are integrated a wide variety of function elements in particular an electrically adjustable rearview device 11 and a display 12 for displaying additional vehicle data. Two sun visors 13 and 14 for the driver and passenger are provided on the side of the main body 10. Sun visors 13 and 14 are each connected to the main body 10 by means of a connecting shaft 15 or 16, and they can be pivoted to rotate separately from one another by means of electric drive motors 17 and

1.8 (indicated with dotted lines alone in FIG. 3) arranged inside of covering module 09.

Figure 4:
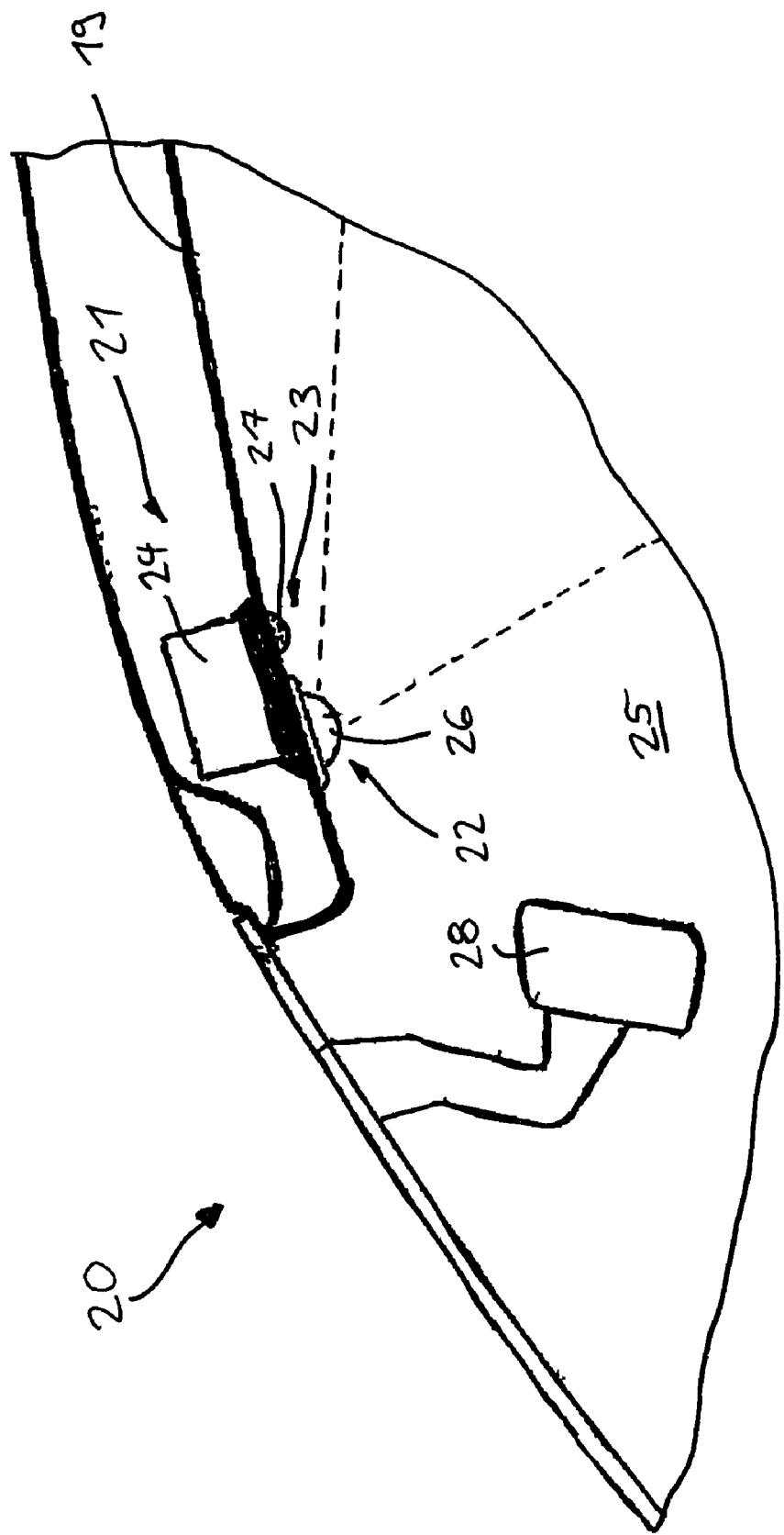
FIG. 4 is a partial cross sectional view of a third embodiment of a covering module according to this invention.

FIG. 4 illustrates a third embodiment 19 of a covering module according to this invention, shown in cross section, arranged on the inside of the roof of a vehicle 20. Data recording system 21 which consists essentially of an optical sensor 22 designed in the manner of a CCD video camera, an acoustic sensor 23 and an electronic memory unit 24 is pre-installed on the covering module 19. The optical sensor 22 and the acoustic sensor 23 pass through the covering module 19 to the rear so that video data and/or audio data from the passenger compartment 25 can be compiled. In front of the optical sensor 22, a wide-angle lens 26, e.g., with a fisheye characteristic, is mounted to allow observation of the largest possible field of view in the passenger compartment 25. The acoustic sensor 23 is covered toward the rear by a perforated protective shield 27. Optical sensor 22 and acoustic sensor 23 are connected to memory unit 24 by signal lines so that the video and audio data compiled in passenger compartment 07 can be stored temporarily in the memory unit 24. In addition, memory unit 24 is also connected to the airbag control (not shown) of vehicle 20. As soon as the airbags of vehicle 20 are deployed, this is recorded in memory unit 24 and the audio and video data 20 compiled during the last 60 seconds is saved.

Due to the arrangement of the optical sensor 22 on the front edge of covering module 19, both the field of view of the driver as well as people on the back seat can be observed. In embodiment 19 of the covering module according to this invention illustrated in FIG. 4, the inside rearview mirror 28 is not integrated into the covering module 19 but instead is mounted as a separate component in vehicle 20.

Figure 5:
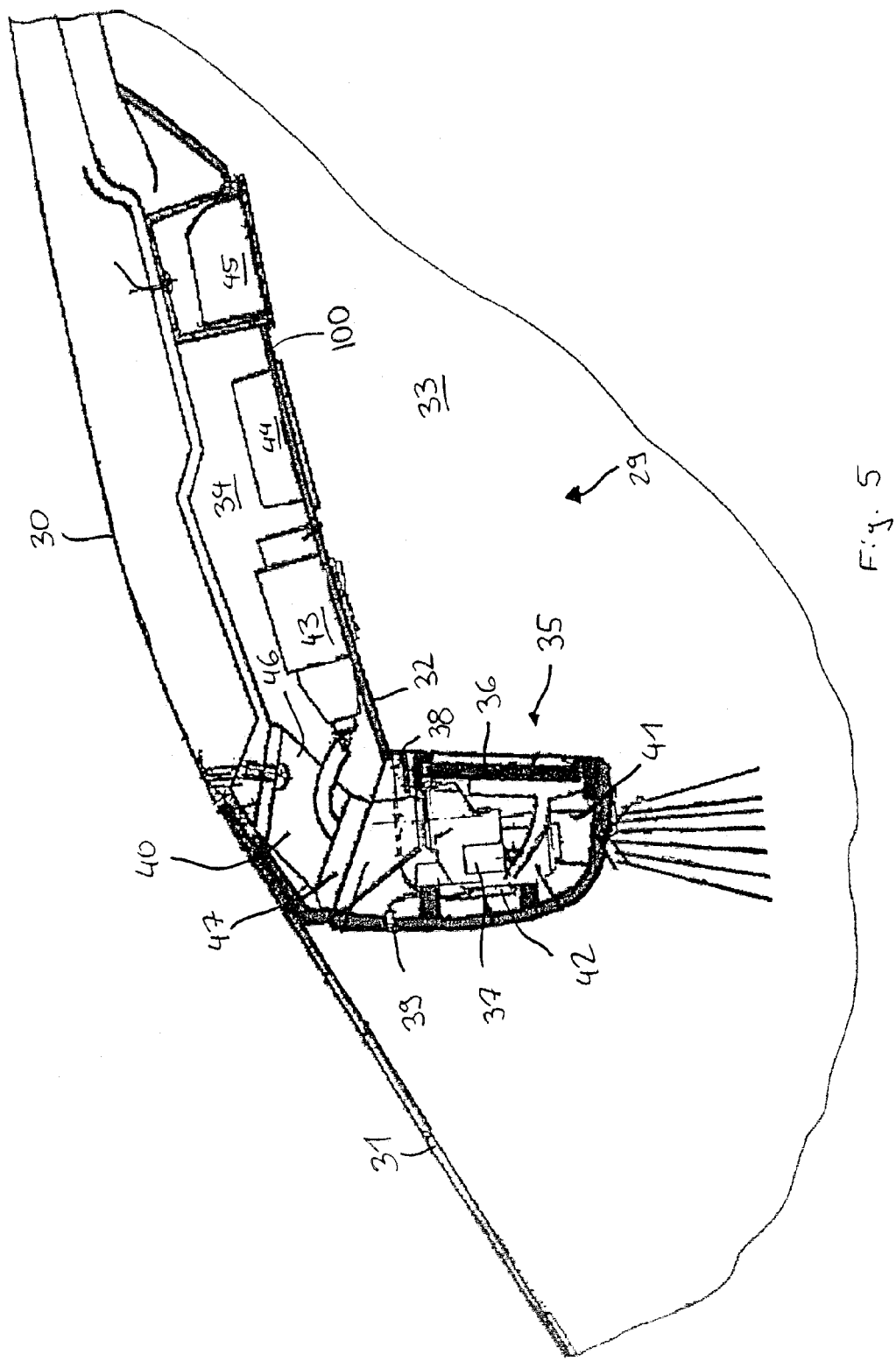
FIG. 5 is a partial cross sectional view of a fourth embodiment of a covering module according to this invention.

FIG. 5 illustrates another embodiment 29 of a covering module according to this invention which is mounted on the inside of the roof of the vehicle roof 30 and partially covers the transition between windshield 31 and vehicle roof 30. Covering module 29 with its component wall 32 forms a hollow space 34 which is sealed off with respect to the interior 33 of the vehicle. A contact element 100, e.g. a plug strip, is provided on the covering module to provide electric or electronic contacting of several function elements provided on the covering module.

In the position where an interior rearview mirror is usually mounted in a vehicle, covering module 29 has a recess 35 in which a rearview device 36 is arranged. The rearview device 36 has a mirror element with an electrochromatic coating.

The rearview device 36 is mounted so it is adjustable in multiple axes in covering module 29. For remote-controlled adjustment of the rearview device 36, an electric adjusting device 37 is provided, only one of the two actuating motors of this being shown in FIG. 5. Due to the adjusting drive 37, the driver has the possibility of individually adjusting the angle of view of rearview device 36 to his own needs by remote control by operating an operating element arranged in the interior, optionally designed in the manner of a joystick, for example.

Above rearview device 36 a light sensor 38 is provided, with which the light intensity of the incident light striking rearview device 36 can be measured. Depending on the light intensity measured by the light sensor 38, the electrochromatic coating on the rearview device 36 may be controlled and dimmed accordingly.

Another light sensor 39 is arranged on the front side of covering module 29 behind the windshield 31 so that the light intensity of the incident light through the windshield 31 can also be measured. In addition, a rain sensor 40 is also integrated into the component Wall 04 of the covering module 29 directly beneath windshield 31 so that the amount of rain striking the windshield 31 can be measured by rain sensor 40.

A reading light 41 is integrated into the covering module 29 on the lower side of the covering module 29 beneath recess 35, so that a cutout is provided in the component wall 32 to allow the passage of light generated by lighting means of reading light 41.

A radio receiver 42 which permits control of vehicle functions by wireless transmission from outside the vehicle, e.g., for operation of the central locking system or certain lighting functions, is provided on the front side of the covering module 29, protected by component wall 32.

In the upper area of covering module 29, an electronic box 43 is also mounted on covering module 29 in hollow space 34. Various control and regulating functions can be implemented with the electronic box 43. In particular, the sliding roof control, control of the interior Lighting and control of the adjustment drive 37 may also be regulated and/or controlled by the electronic box 43.

In addition, an interior light 44 and a glove compartment 45 where glasses or similar items may be stored are integrated into covering module 29.

For fastening covering module 29 to vehicle roof 30, a spacer 46 is provided on the inside of the roof, a catch element 47 being attached to its lower end. The front edge of the component wall 32 of the covering module 29 is inserted between windshield 31 and spacer 46 and is secured in the desired position by catch element 19. Then several mounting screws are screwed through the component wall 32 of covering module 29 to thereby permanently secure the position of covering module 29.

Figure 6:
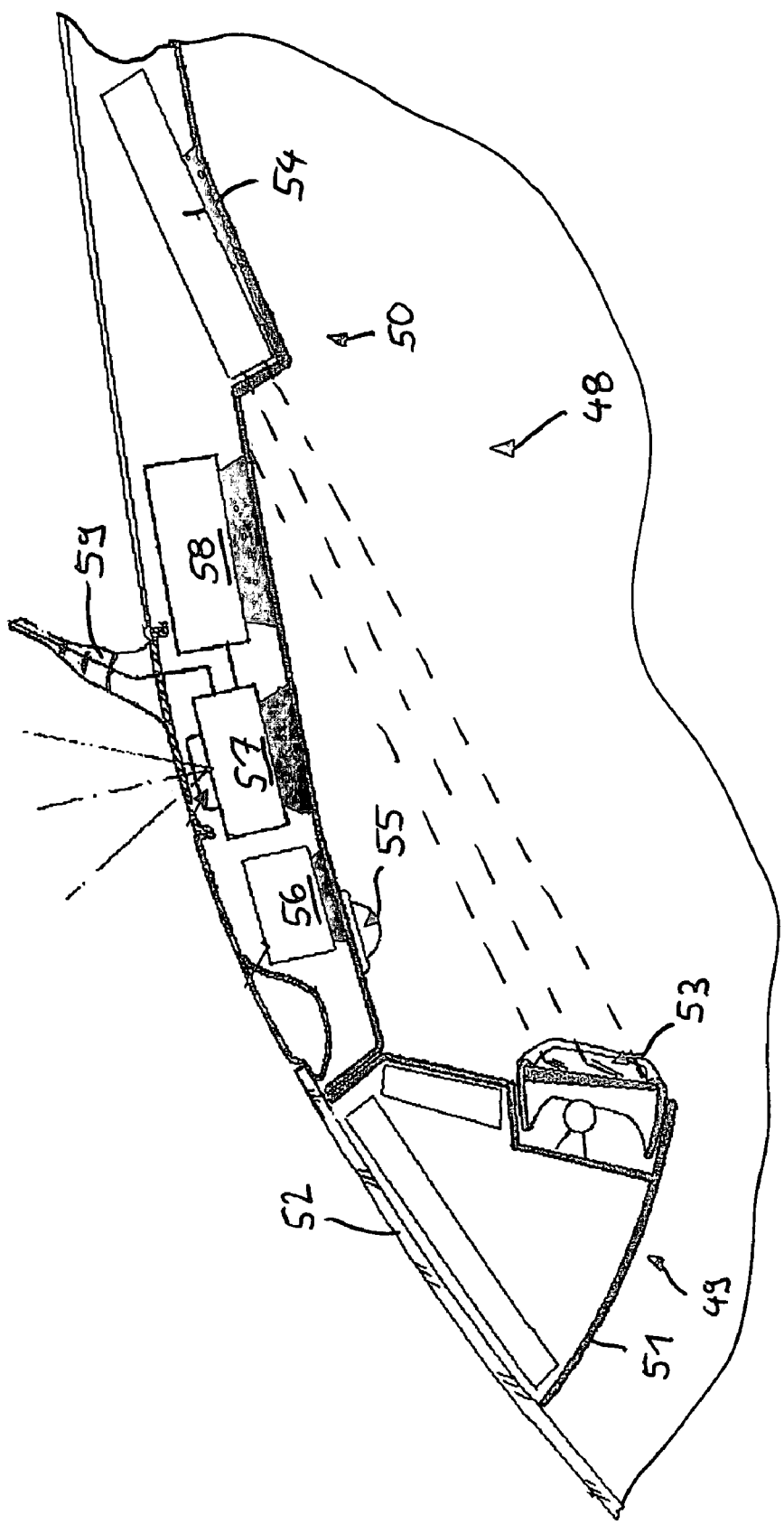
FIG. 6 is partial cross sectional view showing a fifth embodiment of a covering module according to this invention.

FIG. 6 shows another embodiment 48 of a covering module designed in two parts. Covering module 48 is formed by a front partial module 49 and a rear partial module 50. The front edge of the component wall 51 of the front partial module 49 is connected directly to windshield 52 so that a large hollow space is formed behind a rearview device 53. Therefore, a sun protection is readily formed in the center of the vehicle by front partial module 49, so that it is unnecessary to have any additional sun visors or darkening of windshield 52 between the sun visors provided on the sides for the driver and/or the passenger. Rearview device 53 is designed in covering module 48 in the manner of a projection surface on which the images produced in a projection device 54 are reflected. The beam path of the images generated by projection device 54 is diagramed schematically in FIG. 2. The images generated by projection device 54 are first picked up by a camera in the area of the rear of the vehicle and are transmitted as image data to the projection device 54.

Rear partial module 50 may essentially have any desired length and it may extend, for example, to the rear window of the vehicle. Thus in particular a sufficiently great distance between the projection device 54, which is integrated into the rear partial module 50, and the rearview device 53, which is integrated into the front partial module 49, can be achieved. To further accelerate or simplify the final assembly of the vehicle, the two partial modules 49 and 50 may also be connected to one another before the final assembly.

In addition, a camera 55 with which wide areas of the interior of the vehicle can be recorded may also be integrated into the rear partial module 50. Camera 55 works together with a memory unit 56 which is also mounted on the rear partial module 50 in such a way that the data recorded by camera 55 is stored temporarily in memory unit 56 on a rolling basis.

In addition, an antenna carrier element 57 having a GPS antenna and an audio system 58 are also mounted on the rear partial module 50 and a UHF antenna 59 is connected to audio system 58 via antenna carrier element 57.

FIG. 7 shows another embodiment 60 of a covering module according to this invention. Covering module 60 is composed of a front partial module 61, a central partial module 62 and a rear partial module 63. The design of the front partial module 61 corresponds essentially to the design of partial module 49 because in the case of the embodiment illustrated in FIG. 7, the rearview device 64 is designed in the manner of mirror element.

Central partial module 62 which is arranged in front of a sliding roof 65 in the vehicle corresponds in design essentially to partial module 50 as illustrated in FIG. 6 and it also has a camera 66, a memory 67, an antenna carrier element 68 and an audio system 69. Since the rearview device 64 is designed in the manner of a mirror element, there is no need for a projection device such as that provided in the embodiment 48 of the covering module. The rear partial module 63 extends from the rear side of the sliding roof 65 to the rear window. A video display 70 which can be pivoted downward is integrated into the rear partial module 63 so that computer games or movies, for example, can be displayed for the people sitting on the back seat. In addition, an audio system 71, another antenna carrier element 62 with telematics control and integrated GPS antenna, a projection device 73 for projection of video data onto the interior front windshield and/or the dashboard, an additional brake light with an integrated distance sensor 74 and a camera 75 are also integrated into the rear partial module 63.

While a specific embodiment of the invention has been shown and described in detail to illustrate the application of the principles of the invention, it will be understood that the invention may be embodied otherwise without departing from such principles.

The invention claimed is:

1. A covering module for arrangement on the inside of the roof of a vehicle, whereby the covering module covers the interior of the roof in an area of a sheet metal car body at least partially, the module comprising:
   a covering module body having recesses and/or concavities in which transparent components are arranged, said transparent components comprising panes of glass having electrochromatic properties;
   a plurality of function elements, to be provided overhead of the passengers in the vehicle, completely preassembled on the covering module body.

2. The covering module according to claim 1, further comprising: a contact element in the form of a plug strip, provided on the covering module body, so that said function elements contact said plug strip to be in contact with an electric onboard network and/or the electronic databus of the vehicle via a roof contact element provided on the inside of the roof and designed with a complementary function.

3. The covering module according to claim 2, wherein the electric onboard network of the vehicle has a power supply voltage of approximately 42 volts.

4. The covering module according to claim 1, wherein the covering module body is locked in position with a simple joining movement on the inside of the roof.

5. The covering module according to claim 2, wherein the contact element is designed and arranged so that it is in contact with a contact element designed with a complementary function by attaching the covering module body on the inside of the roof.

6. The covering module according to claim 1, wherein the covering module body is composed of multiple partial modules.

7. The covering module according to claim 6, wherein a partial module of the covering module designed in multiple parts is installed facing the front of the vehicle, and the other partial module of the covering module, which is designed in multiple parts, is installed facing the rear of the vehicle.

8. The covering module according to claim 1, wherein in an area in front of the windshield, the covering module body has at least one recess in which a rearview device is arranged, so that the driver observes the traffic following behind the vehicle.

9. The covering module according to claim 8, wherein the rearview device has a mirror element.

10. The covering module according to claim 9, further comprising a drive device, wherein the mirror element is drivable by remote control to adjust the viewing angle with the drive device.

11. The covering module according to claim 10, wherein the mirror element has a memory function so that settings of the mirror element stored according to the respective driver can be called up automatically.

12. The covering module according to claim 9, wherein the mirror element is designed in the manner of a glass prism having two reflective surfaces, whereby the mirror element is dimmed by remote-controlled drive of the glass prism.

13. The covering module according to claim 9, wherein an electrochromatic dimming system is provided on the mirror element to alter the transmission properties.

14. The covering module according to claim 9, wherein the mirror element is colored.

15. The covering module according to claim 8, wherein the rearview device is designed in the manner of an electronic display on which electronic image data can be displayed.

16. The covering module according to claim 15, wherein the display is designed in the manner of a TFT display screen.

17. The cover element according to claim 8, wherein the rearview device has a projection surface on which images emitted by a projection device can be reflected.

18. The covering module according to claim 17, wherein the projection device is integrated into the covering module.

19. The covering module according to claim 1, wherein a left and/or a right sun visor is adjustably mounted on the covering module body and can be adjusted between a resting position and a sun protection position.

20. The covering module according to claim 19, wherein the sun visors pivot rotationally between a resting position and a sun protection position.

21. The covering module according to claim 19, wherein at least one drive unit is provided for adjustment of the sun visors.

22. The covering module according to claim 1, wherein an optical and/or acoustic sensor, is provided in the covering module so that video data and/or audio data can be recorded in the passenger compartment.

23. The covering module according to claim 22, wherein the optical sensor is designed in the manner of a video camera with a CCD chip.

24. The covering module according to claim 22, wherein a wide-angle lens is mounted on the optical sensor.

25. The covering module according to claim 22, wherein the field of view of the driver can be recorded with the optical sensor.

26. The covering module according to claim 22, wherein people sitting on the back seat can be recorded with the optical sensor at least in some areas.

27. The covering module according to claim 22, wherein the optical sensor is suitable for controlling a child seat detection device.

28. The covering module according to claim 22, wherein the data picked up by the sensor is stored temporarily in a memory unit and deleted on a rotating basis.

29. The covering module according to claim 28, wherein the data in the last 5 to 60 seconds of a period of time is stored in a buffer memory in the memory unit.

30. The covering module according to claim 28, wherein on occurrence of a predefined event, the data recording is stopped and the data stored temporarily in the memory unit (24) is saved.

31. The covering module according to claim 22, wherein the memory unit is designed in the manner of a trip recorder in which the data is stored in blocks on a separate data medium.

32. The covering module according to claim 1, wherein the covering module has an antenna carrier element.

33. The covering module according to claim 32, wherein a surface of the antenna carrier element is essentially flush with the top side of the roof.

34. The covering module according to claim 32, wherein an antenna is arranged directly or indirectly on a lower side of the antenna carrier element opposite a surface of the antenna carrier element.

35. The covering module according to claim 34, wherein the antenna is a GPS antenna.

36. The covering module according to claim 35, wherein the GPS antenna is integrally connected to a telematic control unit.

37. The covering module according to claim 34, wherein the antenna is a VHF antenna.

38. The covering module according to claim 34, wherein the antenna is a radio antenna.

39. The covering module according to claim 34, wherein the antenna is integrally connected to the antenna carrier element.

40. The covering module according to claim 34, wherein the antenna is sheathed by material of the antenna carrier element.

41. The covering module according to claim 34, wherein the antenna is a ring body antenna.

42. The covering module according to claim 32, wherein the antenna carrier element is made of a material which is permeable for electromagnetic waves.

43. The covering module according to claim 32, wherein the antenna carrier element is made of plastic.

44. The covering module according to claim 32, wherein the antenna carrier element is made of glass.

45. The covering module according to claim 32, wherein the antenna carrier element has at least one hook part which in the installed state of the antenna carrier element extends around the roof with an undercut.

46. The covering module according to claim 32, wherein the antenna carrier element is glued to the roof.

47. The covering module according to claim 32, wherein the antenna carrier element has a projection in which an antenna cable is arranged.

48. The covering module according to claim 32, wherein at least one solar cell is arranged in the area of a surface of the antenna carrier element.

49. The covering module according to claim 48, wherein the solar cell is integrally arranged in the antenna carrier element.

50. The covering module according to claim 32, wherein at least one sensor is arranged in or on the antenna carrier element.

51. The covering module according to claim 49, wherein the sensor is a temperature sensor.

52. The covering module according to claim 32, wherein the antenna carrier element is painted the same color as the roof.

53. The covering module according to claim 32, wherein the antenna carrier element is made of a plastic material, which is the same color as an automotive part.

54. The covering module according to claim 1, wherein at least one lighting device is integrated into the covering module body for lighting the interior.

55. The covering module according to claim 1, wherein a radio receiver for controlling a central lock and/or an interior lighting circuit is integrated into the covering module body.

56. The covering module according to claim 1, wherein a rain sensor and/or a light sensor is/are integrated into the covering module.

57. The covering module according to claim 1, wherein at least one glove compartment is integrated into the covering module.

58. The covering module according to claim 1, wherein a brake light and/or a flashing light and/or a searchlight is integrated into the covering module behind a window of the vehicle.

59. The covering module according to claim 1, wherein at least one loudspeaker is integrated into the covering module body.

60. The covering module according to claim 1, wherein an anti-theft alarm system is integrated into the covering module.

61. The covering module according to claim 1, wherein a multifunction display is integrated into the covering module.

62. The covering module according to claim 1, wherein a sliding roof control is integrated into the covering module.

63. The covering module according to claim 1, wherein an actuating element for remote adjustment of an interior and/or exterior rearview mirror is integrated into the covering module.

64. The covering module according to claim 1, wherein a video display that is pivotably mounted, is integrated into the covering module so that entertainment data can be displayed on it.

65. The covering module according to claim 64, wherein the video display is designed in the manner of a TFT display screen.

66. The covering module according to claim 64, wherein the video display is arranged above the back seat in the field of view of passengers sitting there.

67. The covering module according to claim 1, wherein a media console, with a DVD player, is integrated into the covering module.

68. The covering module according to claim 1, wherein a communication device, is integrated into the covering module.

69. The covering module according to claim 1, wherein at least one sensor measuring the distance from vehicles traveling in front of and/or behind the vehicle is integrated into the covering module body.

* * * * *